(12) United States Patent
Rodrigues

(10) Patent No.: US 11,513,266 B2
(45) Date of Patent: Nov. 29, 2022

(54) SYSTEMS AND METHODS FOR AN IMPROVED CAMERA SYSTEM USING DIRECTIONAL OPTICS TO ESTIMATE DEPTH

(71) Applicant: Toyota Motor Engineering & Manufacturing North America, Inc., Plano, TX (US)

(72) Inventor: Sean P. Rodrigues, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/116,300

(22) Filed: Dec. 9, 2020

(65) Prior Publication Data

US 2022/0179135 A1 Jun. 9, 2022

(51) Int. Cl.
| | |
|---|---|
| *H04N 5/225* | (2006.01) |
| *G06T 7/55* | (2017.01) |
| *G02B 5/18* | (2006.01) |
| *H04N 9/04* | (2006.01) |
| *G02B 5/20* | (2006.01) |
| *G01B 11/22* | (2006.01) |
| *G02B 1/00* | (2006.01) |

(52) U.S. Cl.
CPC ............... *G02B 5/18* (2013.01); *G01B 11/22* (2013.01); *G02B 1/005* (2013.01); *G02B 5/201* (2013.01); *G06T 7/55* (2017.01); *H04N 5/2251* (2013.01); *H04N 9/0455* (2018.08); *G02B 2005/1804* (2013.01); *G06T 2207/10028* (2013.01)

(58) Field of Classification Search
CPC .......... G02B 5/18; G02B 1/005; G02B 5/201; G02B 2005/1804; G06T 7/55; G06T 2207/10028; H04N 9/0455; H04N 5/2251; G01B 11/22
USPC ....................................................... 348/135
See application file for complete search history.

(56) References Cited

U.S. PATENT DOCUMENTS

| | | | |
|---|---|---|---|
| 8,830,556 B2 | 9/2014 | Smith et al. | |
| 9,448,460 B2 | 9/2016 | Shen et al. | |

(Continued)

FOREIGN PATENT DOCUMENTS

| | | |
|---|---|---|
| WO | 2019048200 A1 | 3/2019 |
| WO | 2019075335 A1 | 4/2019 |
| WO | 2020002164 A1 | 1/2020 |

OTHER PUBLICATIONS

Yang et al. "Photonic Crystal Fiber Metalens", Research Gate, Nanophotonics 2019, Oct. 2019.*

(Continued)

*Primary Examiner* — James T Boylan
(74) *Attorney, Agent, or Firm* — Christopher G. Darrow; Darrow Mustafa PC

(57) ABSTRACT

System, methods, and other embodiments described herein relate to a camera system. In one embodiment, the camera system includes a lens to receive light associated with an object and a first component, operatively connected to the lens, that inverts the light. The camera system also includes a second component, operatively connected to the first component, that resolves an angle of the light. A detector array, operatively connected to the second component, senses the light using a pixel to form an image to estimate depth of the object.

20 Claims, 9 Drawing Sheets

(56) References Cited

U.S. PATENT DOCUMENTS

| | | | |
|---|---|---|---|
| 10,634,557 | B2 | 4/2020 | Khorasaninejad et al. |
| 2015/0219806 | A1* | 8/2015 | Arbabi .................. G02B 5/1847 359/573 |
| 2015/0381968 | A1* | 12/2015 | Arora ...................... G06T 17/00 348/47 |
| 2017/0082263 | A1 | 3/2017 | Byrnes et al. |
| 2017/0220887 | A1* | 8/2017 | Fathi .................. G06K 9/00208 |
| 2017/0251193 | A1* | 8/2017 | Zhou ...................... G01C 11/06 |
| 2018/0284428 | A1* | 10/2018 | Guenter ................. G02B 5/201 |
| 2019/0006743 | A1 | 1/2019 | Kirino et al. |
| 2019/0154877 | A1* | 5/2019 | Capasso ................... G02B 5/18 |
| 2020/0160598 | A1 | 5/2020 | Manivasagam et al. |
| 2020/0210726 | A1 | 7/2020 | Yang et al. |
| 2020/0225386 | A1* | 7/2020 | Tsai ..................... G02B 3/0068 |
| 2020/0363323 | A1* | 11/2020 | Quaranta .............. G01J 3/0262 |
| 2021/0103075 | A1* | 4/2021 | Park ....................... G02B 5/126 |
| 2021/0149081 | A1* | 5/2021 | Groever .............. G02B 5/1842 |
| 2021/0325541 | A1* | 10/2021 | Kim .................. H04N 5/36965 |
| 2021/0389599 | A1* | 12/2021 | Wang ..................... G02B 1/002 |

OTHER PUBLICATIONS

Wang et al., Pseudo-lidar from visual depth estimation: Bridging the gap in 3D object detection for autonomous driving, Proceedings of the IEEE Computer Society Conference on Computer Vision and Pattern Recognition, pp. 8445-8453, (2019).

You et al., "Pseudo-LiDAR++: Accurate Depth for 3D Object Detection in Autonomous Driving," ICLR, pp. 1-22, arXiv:1906.06310v3 [cs.CV] Feb. 15, 2020.

Kyle Field, "Tesla Achieved The Accuracy Of Lidar With Its Advanced Computer Vision Tech," pp. 1-4, Aug. 3, 2020.

Kang et al., "Electrifying photonic metamaterials for tunable nonlinear optics," Nature Communications, Article No. 4680, pp. 1-7, Aug. 2014.

Liang et al., "Free-standing plasmonic metal-dielectric-metal bandpass filter with high transmission efficiency," Scientific Reports, Article No. 4357, pp. 1-8, Jun. 28, 2017.

Sinha et al., "Depth Estimation by Learning Triangulation and Densification of Sparse Points for Multi-view Stereo," pp. 1-22, arXiv:2003.08933v1 [cs.CV] Mar. 19, 2020.

Ding et al., "Learning Depth-Guided Convolutions for Monocular 3D Object Detection," pp. 1-12, arXiv:1912.04799v2 [csCV] Dec. 13, 2019.

Nakamura et al., "Real-time monocular ranging by Bayesian triangulation," 2013 IEEE Intelligent Vehicles Symposium (IV) pp. 1368-1373, Jun. 2013, Gold Coast, Australia.

Weng et al., "Monocular 3D Object Detection with Pseudo-LiDAR Point Cloud," Proceedings of the IEEE/CVF International Conference on Computer Vision, pp. 1-10, Mar. 2019.

Chen et al., "DSGN: Deep Stereo Geometry Network for 3D Object Detection," IEEE/CVF Conference on Computer Mision and Pattern Recognition (CVPR), 2020, pp. 12536-12545.

Wang et al., "Flow-Motion and Depth Network for Monocular Stereo and Beyond," IEEE Robotics and Automation Letters, vol. 5, No. 2, pp. 3307-3314, Apr. 2020.

Qin et al., "Triangulation Learning Network From Monocular to Stereo 3D Object Detection," 2019 IEEE/CVF Conference on Computer Vision and Pattern Recognition, Long Beach, CA, USA, 2019, pp. 7607-7615.

Munguia et al., "A Robust Approach for a Filter-Based Monocular Simultaneous Localization and Mapping (SLAM) System," Sensors 2013, 13, pp. 8501-8522.

Kogos et al., "Plasmonic ommatidia for lensless compound-eye vision," Nat Commun 11, 1637, pp. 1-9, (2020).

Lan et al., "Metasurfaces for Near-Eye Augmented Reality," ACS Photonics 2019 6 (4), pp. 1-23.

Khorasaninejad et al., "Metalenses at visible wavelengths: Diffraction-limited focusing and subwavelength Yesolution imaging," Science, vol. 352, issue 6290, pp. 1 190-1194, Jun. 2016.

Arbabi et al., "Miniature optical planar camera based on a wide-angle metasurface doublet corrected for monochromatic aberrations," Nat Commun 7, 13682, pp. 109, (2016).

Kamali et al., "A review of dielectric optical metasurfaces for wavefront control," Nanophotonics 2018; 7(6), pp. 1041-1068.

Zou et al., "Imaging based on metalenses," PhotoniX 1, 2, pp. 1-24, (2020).

Khorasaninejad et al., "Super-Dispersive Off-Axis Meta-Lenses for Compact High Resolution Spectroscopy," Nano Lett. 2016, 16, pp. 3732-3737.

Adams et al., "Perfect compensation of absorption in metamaterials for diffraction-unlimited imaging," 7th International Conference on Metamaterials, Photonic Crystals and Plasmonics 2016, Non-Hermitian engineering in photonics, plasmonics and metamaterial, 2 pages, Jul. 2016, Malaga, Spain.

Bayati et al., "Inverse designed metalenses with extended depth of focus," ACS Photonics 2020, 7, 4, 873-878.

Phare et al., "Silicon Optical Phased Array with High-Efficiency Beam Formation over 180 Degree Field of View," pp. 1-12 (2018).

Li et al., "Metalens-Based Miniaturized Optical Systems," Micromachines 2019, 10, pp. 1-21.

Shalaginov et al., "A single-layer panoramic metalens with > 170° diffraction-limited field of view," pp. 1-14, (2019).

* cited by examiner

SYSTEMS AND METHODS FOR AN IMPROVED CAMERA SYSTEM USING DIRECTIONAL OPTICS TO ESTIMATE DEPTH

TECHNICAL FIELD

The subject matter described herein relates, in general, to a camera system, and, more particularly, to an improved camera system including directional optics to estimate depth.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect the presence of objects and other features of the surrounding environment. In further examples, additional/alternative sensors, such as multiple cameras, may be implemented to acquire information about the surrounding environment from which a system derives awareness about aspects of the surrounding environment. This sensor data can be useful in various circumstances for improving perceptions of the surrounding environment so that systems such as automated driving systems can perceive the noted aspects and accurately plan and navigate accordingly.

In general, the further awareness is developed by the vehicle about a surrounding environment, the better a driver can be supplemented with information to assist in driving and/or the better an autonomous system can control the vehicle to avoid hazards. A system using LIDAR for object detection is optimal for long ranges. Therefore, a vehicle may use a pseudo-lidar system to detect objects using an image(s) processed by a system using multiple cameras and sensors for wider ranges. In one approach, a pseudo-lidar system may create a spatial point distribution similar to LIDAR systems using images that vary in time and space. However, pseudo-lidar systems may be computationally intensive particularly when using multiple cameras and sensors causing frustration.

Moreover, a pseudo-lidar system may take images from multiple cameras. A vehicle, camera, or object in motion may cause distortion to the images from multiple cameras. A pseudo-lidar system may resolve images from multiple cameras using a machine process to search for image overlap. For instance, an image overlap may be a stereo-pair having two or more images that share a corresponding image point. However, a pseudo-lidar system searching for image overlap may be time-consuming and computationally intensive.

SUMMARY

In one embodiment, example systems and methods relate to a manner of improving pseudo-lidar detection using a camera system including directional optics to estimate depth of an object. In various implementations, pseudo-lidar systems are computationally intensive at accurately detecting objects when combining data from multiple cameras and sensors. Furthermore, pseudo-lidar hardware using multiple sensors may increase the physical size of the component, processing tasks, and delays to estimate depth. Accordingly, current pseudo-lidar systems encounter difficulties for efficiently estimating depth that causes frustration. Therefore, in one embodiment, a camera system reduces computation and cost for estimating depth of an object using purpose-built hardware to simplify processing by resolving angles of a lightwave(s) associated with an image(s). The camera system may resolve angles of a lightwave(s) according to parameters of a lens optimized to estimate the depth. In one approach, a camera system uses independent filtering for each pixel of a detector array to resolve particular angles of a lightwave(s) for subsequently estimating depth. The camera system may redirect a lightwave(s) associated with a reduced resolution image per pixel of the detector array to improve objection detection. The output(s) of the camera system may be image(s) data at a wide field-of-view due to combining redundant information of a scene. In one approach, the output(s) may be a patterned representation including the object that simplifies and improves subsequent tasks for estimating depth.

In addition, the camera system may perform filtering of light associated with an object by dividing a detector array into sections to resolve particular angles of a lightwave(s) for subsequently estimating depth. For example, the camera system may use per quadrant filtering with a detector array divided into areas that each have a different focus to resolve an angle(s) of a lightwave(s) associated with an image. A vehicle may be equipped with a camera system using per pixel or area filtering according to efficiency or performance requirements. Furthermore, the camera system may filter light by wavelength for a color image(s) prior to further filtering. In one approach, the camera system may use resonant waveguide gratings (RWG) on the light to resolve angles of a lightwave(s). The camera system may use the RWG as a bandpass filter to transmit resolved angles of light at the wavelength to a pixel of the detector array. In this way, purpose-built hardware may improve the estimation of depth using lenses on a single detector that leave image points with respective depth information calculated using pixel spacing and other information.

In one embodiment, an improved camera system including directional optics for estimating depth is disclosed. The camera system includes a lens to receive light associated with an object and a first component, operatively connected to the lens, that inverts the light. The camera system also includes a second component, operatively connected to the first component, that resolves an angle of the light. A detector array, operatively connected to the second component, senses the light using a pixel to form an image to estimate depth of the object.

In another embodiment, an improved camera system including directional optics for estimating depth is disclosed. The camera system includes a lens to receive light associated with an object and a first component, operatively connected to the lens, that inverts the light. The camera system also includes a second component, operatively connected to the first component, that resolves an angle of the light. A detector array, operatively connected to the second component, senses the light in a section of the detector array to form an image to estimate depth of the object.

In another embodiment, an improved camera system including directional optics for estimating depth is disclosed. The camera system includes a lens to receive light associated with an object proximate to a vehicle. The camera system also includes a first filter operatively connected to the lens and configured to invert the light. A second filter operatively connected to the first filter is configured to resolve an angle of the light. A pixel array operatively connected to the second filter is configured to sense the light using a pixel to form an image to estimate depth of the object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
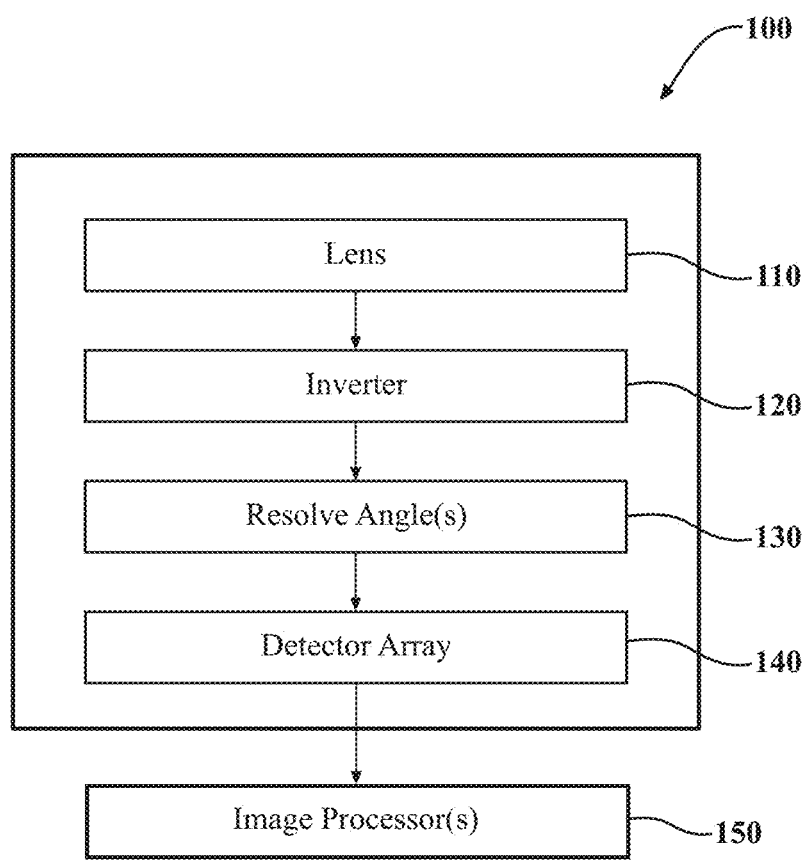
FIG. 1 illustrates one embodiment of a camera system using filters for estimating depth associated with an object in a scene.

Systems, methods, and other embodiments associated with improving a camera system using directional optics and filters for estimating depth are disclosed herein. The camera system detects an object and reduces costs by optically resolving the angles of lightwave(s) from multiple views captured through an inverted lens. The camera system may process by color wavelength, invert, and filter the captured light to be detected per pixel or area according to parameters of a lens thereby capturing different images by a detector at a specific angle. The camera system may optically remove any parallelism caused by the inverted lens before further capture. In one approach, a camera system using per pixel filtering may have independent filters on each pixel to resolve the angles of a lightwave(s) on an individual basis. In one approach, image detection is improved using per pixel filtering by resolving angles on an individual basis rather than generally on an area of the image. A camera system may resolve an angle of a lightwave(s) or image(s) by interpreting angular offsets caused by the planar feature of a lightwave(s) captured by a camera system. Furthermore, processing by color may be performed by resonant waveguide gratings (RWGs) that transmit a lightwave(s) to the detector array if the lightwave(s) matches the wavelength and the angle of a color filter and the metasurface, respectively, for accurate color resolution.

Similar to per pixel filtering, a camera system may process an image to detect an object using a detector array divided into sections to resolve particular angles of a lightwave(s) for subsequently estimating depth of the object. For example, a camera system may use a per quadrant filter of X by X dimensions in size according to the number of quadrants arranged for a detector array. In one approach, a camera system may use different size apertures for each section or quadrant allowing capture of various levels of light by area rather than individual pixels.

Furthermore, a camera system may perform filtering using metamaterials such as metalenses or metasurfaces. In one approach, metasurfaces provide a substantially flat profile resulting in denser use in an array of lenses that reduces image distortion. The transmission profile of metamaterials may include a desired region of light for transmission to a pixel in an angle range. In this way, a camera system detects an image with improved accuracy and reduced complexity using metasurfaces and per pixel or area filtering for estimating depth.

The output(s) of the detector array may form a patterned representation of image data that includes the object to estimate depth. The patterned representation may represent the image(s) from multiple views that overlap. The camera system may improve detection by resolving an angle(s) of the image(s) per pixel or area. Furthermore, a system for estimating depth may generate a point cloud from the patterned representation by triangulation with improved accuracy due to the combined multiple views. The point cloud may be similar to representations generated by LIDAR systems for estimating depth using the simpler purpose-built hardware thereby improving implementations.

FIG. 1 illustrates one embodiment of a camera system 100 using filters for estimating depth associated with an object in a scene. A system may estimate depth similar to systems that use pseudo-lidar, stereovision, and so on. The camera system 100 may be incorporated in a vehicle for detecting hazardous objects or obstacles in the field-of-view. However, in various implementations given herein, the camera system 100 may be used in a security system, traffic system, municipal monitoring system, mobile device, and so on for multi-perspective imaging using a single camera system. In one approach, an automated driving system (ADS) may process the output(s) from the camera system to estimate depth for avoiding the objects or obstacles. The camera system may be a single camera unit or multiple camera components that capture images of the same object from different or overlapping views. In the camera system 100, a lens 110 may receive a lightwave(s) associated with one or more objects in a field-of-view. A lens may be a single lens or a lens system. A lens system can include two or more optical elements in conjunction with one or more apertures or focal points. An aperture is a hole or opening that allows or limits light for detection and defines a cone angle for rays that focus in the image plane. An aperture may include irises or pupils.

Furthermore, an inverter component 120 may invert the lightwave(s) received from the lens 110 for inverted lens configurations to obtain light orientation. The angle resolution component 130, in one approach, may resolve an angle of the lightwave(s) and improve image detection by transmitting the lightwave(s) or photons, for example, at 15-30 degrees from the z-axis to the detector array 140. However, in the examples given herein the camera system may transmit the lightwave(s) or photons at 1-45 degrees from normal. The angle resolution component 130 may use per pixel or area filtering. As further explained herein, the filtering may use metasurfaces.

In per pixel filtering, the camera system 100 uses pixel placement of independent filters to resolve the angles of a lightwave(s) for pixels individually. The size of an independent filter may match the size of each pixel of the detector array 140. The camera system 100 improves image capture for estimating depth using per pixel filtering by resolving an angle(s) of light from many perspectives individually rather than by area of a detector array. In per section filtering, the camera system 100 may divide a detector array into a plurality of areas, such as quadrants, where each area is a different focus, view, or offset of the image. A vehicle may be equipped with a camera system using per pixel or area filtering according to efficiency or performance requirements. For example, the camera system improves image detection of multiple views using per quadrant filtering by angle(s) of light according to areas of a detector array that capture an image rather than by pixel. In one approach, the image processor(s) 150 may process the output(s) of the detector array 140 to alter image data into a patterned representation that includes the objects for improving subsequent tasks to estimate depth.

FIGS. 2A-2E illustrate various embodiments of a camera system using filters for estimating depth associated with an object in a scene and an output(s) of the camera system. In one approach, in FIG. 2A the camera system may use a pixel array 210 with eight filters on eight pixels in a section 220. The section 220 is arranged for per pixel filtering to resolve an angle of a lightwave(s) associated with a captured image to improve detection from multiple views or perspectives. In per pixel filtering, a system uses independent filters to resolve the angles of a lightwave(s) for each pixel individually. A camera system improves image detection using per pixel filtering resolving angles individually rather than generally on an area of the image. For example, per pixel filtering may direct the lightwave(s) or photons transmitted at 15-30 degrees from the z-axis to a single-pixel. In this way, a single-pixel of the filter on section 220 has a resolved angle of the lightwave(s) to output for simplified depth processing or estimation.

Figure 2A:
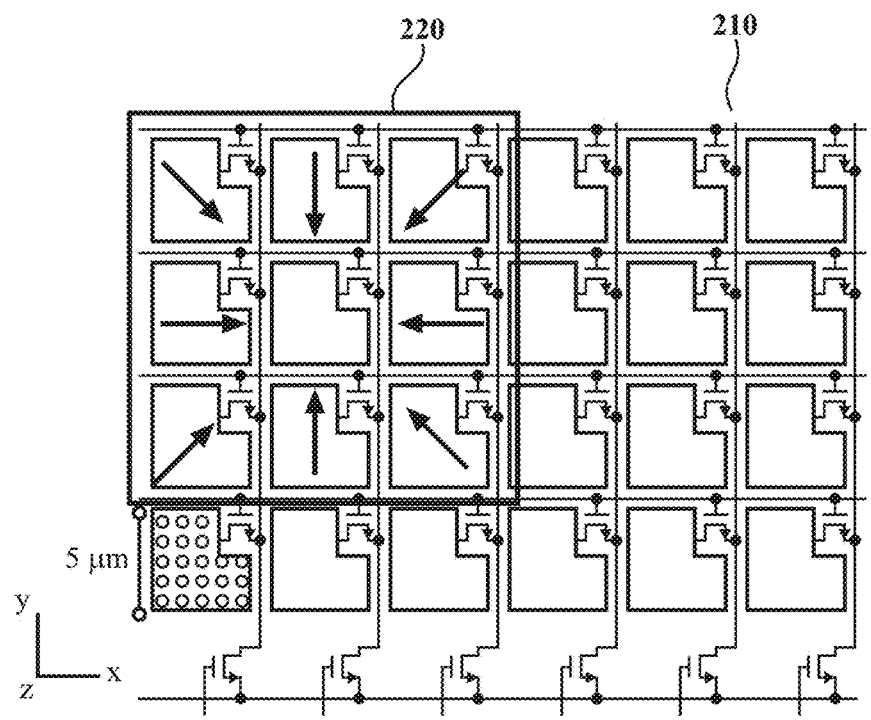
FIGS. 2A-2E illustrate various embodiments of a camera system using filters for estimating depth associated with an object in a scene and an output(s) of the camera system.
Figure 2B:
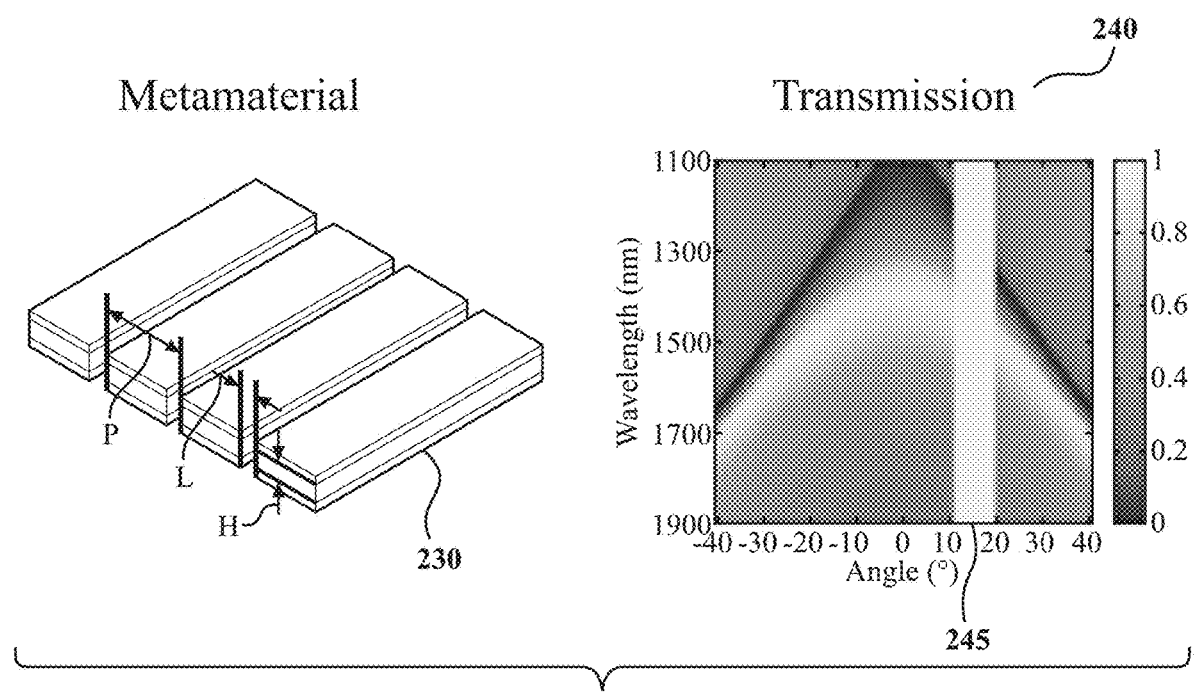

In FIG. 2B, a metamaterial 230 is shown with a spacing P, a gap L, and a height H for angle-dependent filtering or transmission. A metasurface lens or filter may use metamaterials that provide a substantially flat profile resulting in denser use on the pixel array 210 reducing image distortion. In one approach, a filter may use metamaterials such a photonic band-gap crystal. Furthermore, in the examples given herein the metamaterials may have a symmetric profile and gratings having an asymmetric profile. The transmission profile 240 includes a desired region of light for transmission to a pixel in an angle range 245.

Figure 2C:
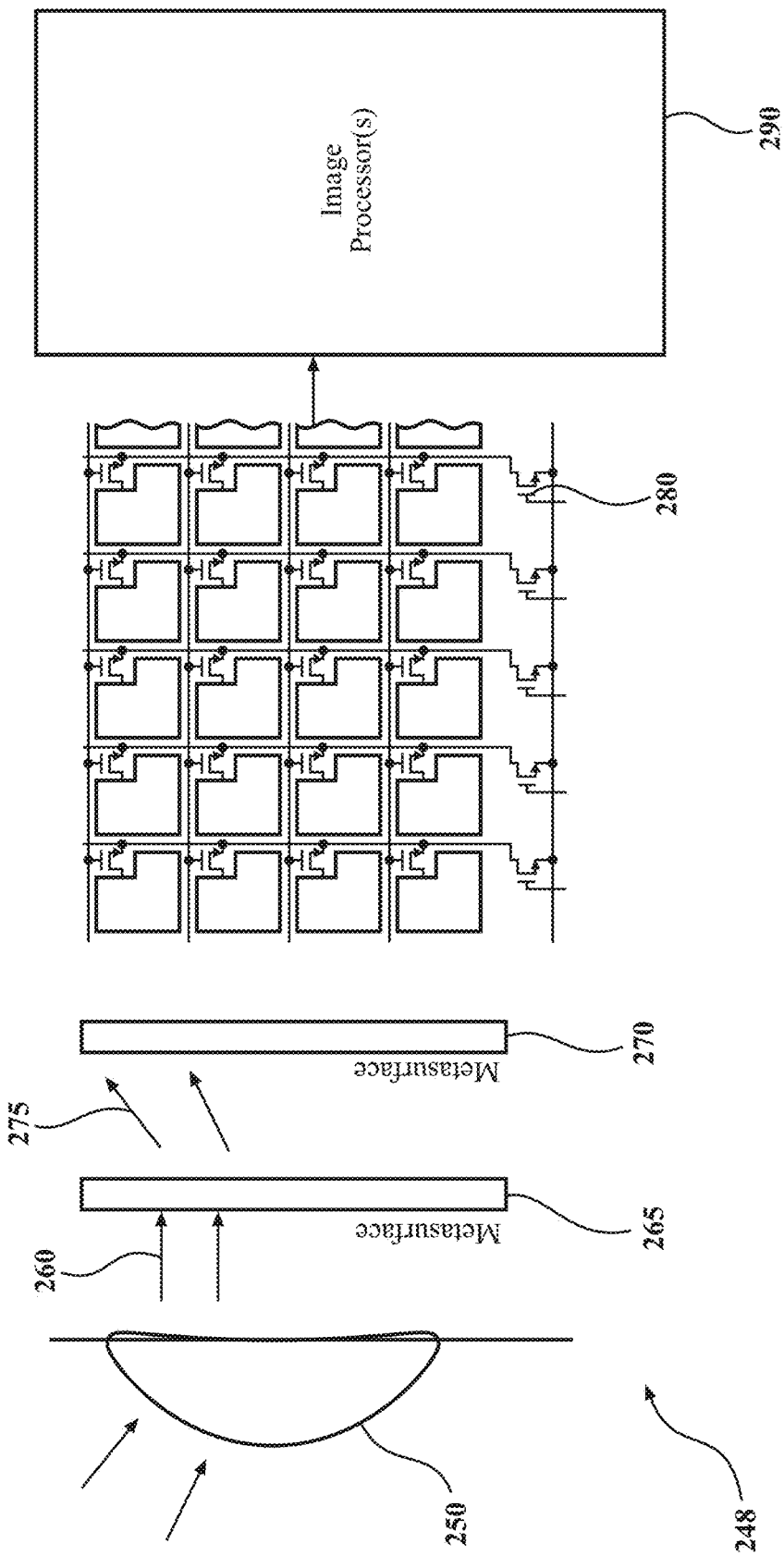

Turning now to the camera system 248 in FIG. 2C, the lens 250 may receive and direct the light 260 associated with an object to the metasurface 265, such as a metasurface lens. The camera system 248 may resolve an angle of a lightwave(s) at an angle according to parameters of properties associated with a lens, metalens, or metasurfaces 265 and 270. For example, the parameters may define an amount of refraction or directing of a lightwave(s) at a particular intensity. A system may resolve angles of a lightwave(s) according to parameters of a lens optimized to estimate depth. A lens may be a single lens or a lens system. A lens system can include two or more optical elements in conjunction with one or more apertures or focal points. An aperture may include irises or pupils.

Moreover, the metasurface 265 may invert and undo planarization caused by the lens 250 such as by diffraction of the k-vector of the light 260 for further filtering. A metasurface lens may be configured in the camera system for close placement to the pixel array 280 thereby reducing system size and distortion. In one approach, the metasurface lens may be composed of a photonic band-gap crystal. However, a system may use any lens composition to invert the light 260 for further processing. Furthermore, the lens 250, the metasurface 265, the metasurface(s) 270, and the pixel array 280 may be operatively connected. The term "operatively connected," as used throughout this description, can include direct or indirect connections, including connections without direct physical contact.

Moreover, the metasurface(s) 270 may receive the transmitted light 275 from the metasurface 265. In one approach, the metasurface(s) 270 may provide per pixel or area filtering to resolve an angle of the transmitted light 275 to detect an image(s). Resolving angles of a lightwave(s) may be needed since a lightwave takes the form of a plane wave for capture by the pixel array 280. The metasurface(s) 270 may undo planarization of the plane wavefront and thereby improve image detection for estimating depth. A proximal distance of the metasurface(s) 270 and another filter(s) to resolve an angle may result in minimal distortion of the image(s) due to the substantially flat profile of metasurfaces. The lightwave(s) that passes through a filter provides an image for improved detection or capture. For example, the metasurface(s) 270 may transmit a lightwave(s) or a photon(s) at 15-30 degrees from the z-axis to a single-pixel according to per pixel filter placement that resolves an angle of the transmitted light 275. In this way, a single-pixel of the pixel array 280 has a resolved angle of the lightwave(s) to output to the image processor(s) 290 for simplified estimation of depth.

In one approach, the metasurface 270 may filter the light using per section filtering. In one approach, a camera system may use a per quadrant filter of X by X dimensions, where X is the pixel size for a single filter. The filter on section 220 may include a number of quadrants, divisions, and so on. In one approach, different size apertures may be used for each area or quadrant allowing capture of various levels of light by area or quadrant rather than individual pixels. The camera system 248 may capture many perspectives of a scene on a single detector or pixel array by detecting a lightwave(a) directed, emitted, or scattered from a specific direction to a specific area to detect an image rather than by pixel.

Figure 2D:
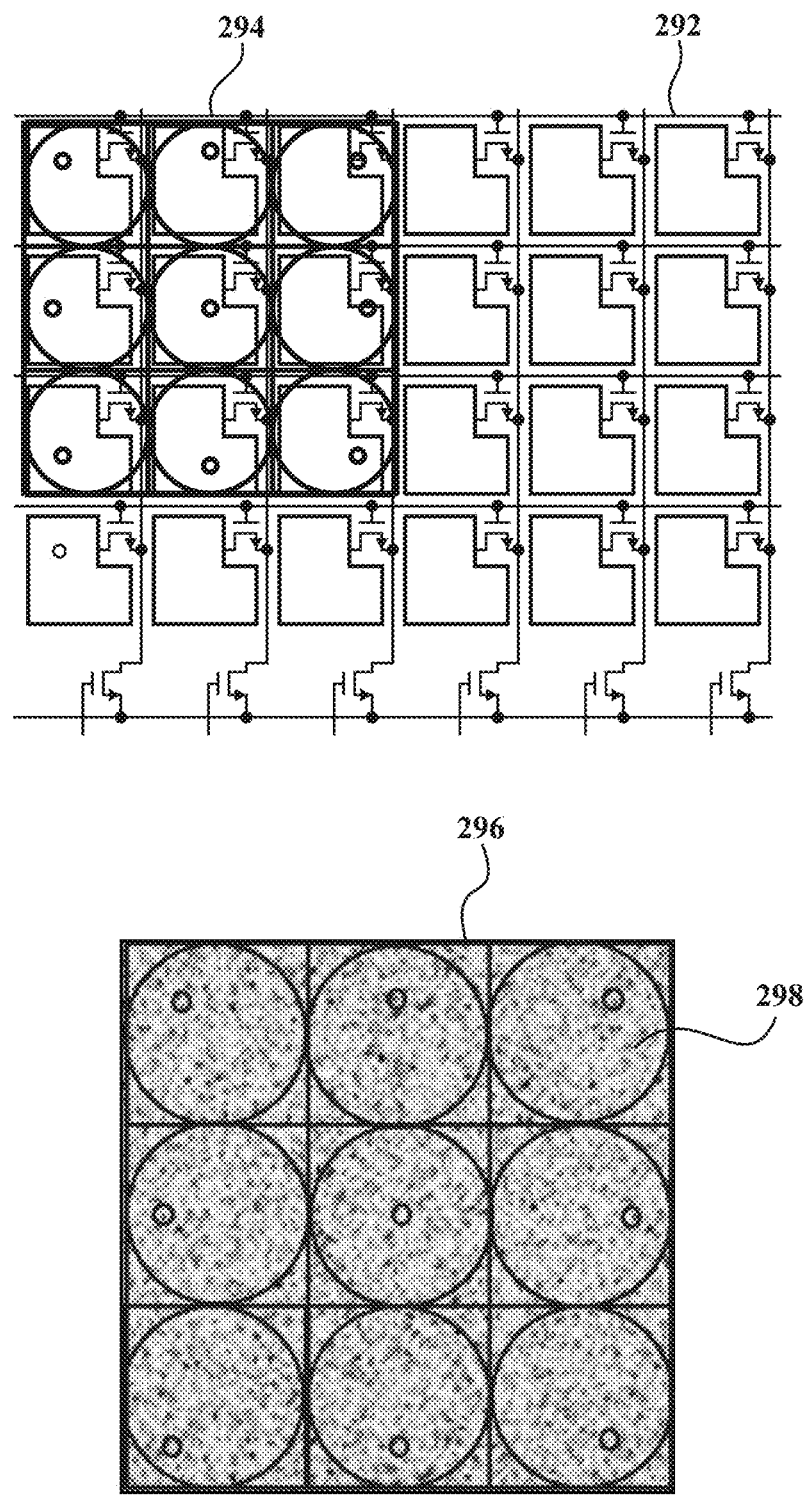

FIG. 2D illustrates an angle-based filtering approach to resolve an angle. For per pixel filtering, the detector array or pixel array 292 may use a plurality of angle-based filters 294 for per pixel filtering. For per area filtering, a plurality of angle-based filters 296 may be placed on-chip composed of pixel arrays 298. Each filter of filters 296 may correspond to an individual pixel or area for image capture associated with an angle.

Figure 2E:
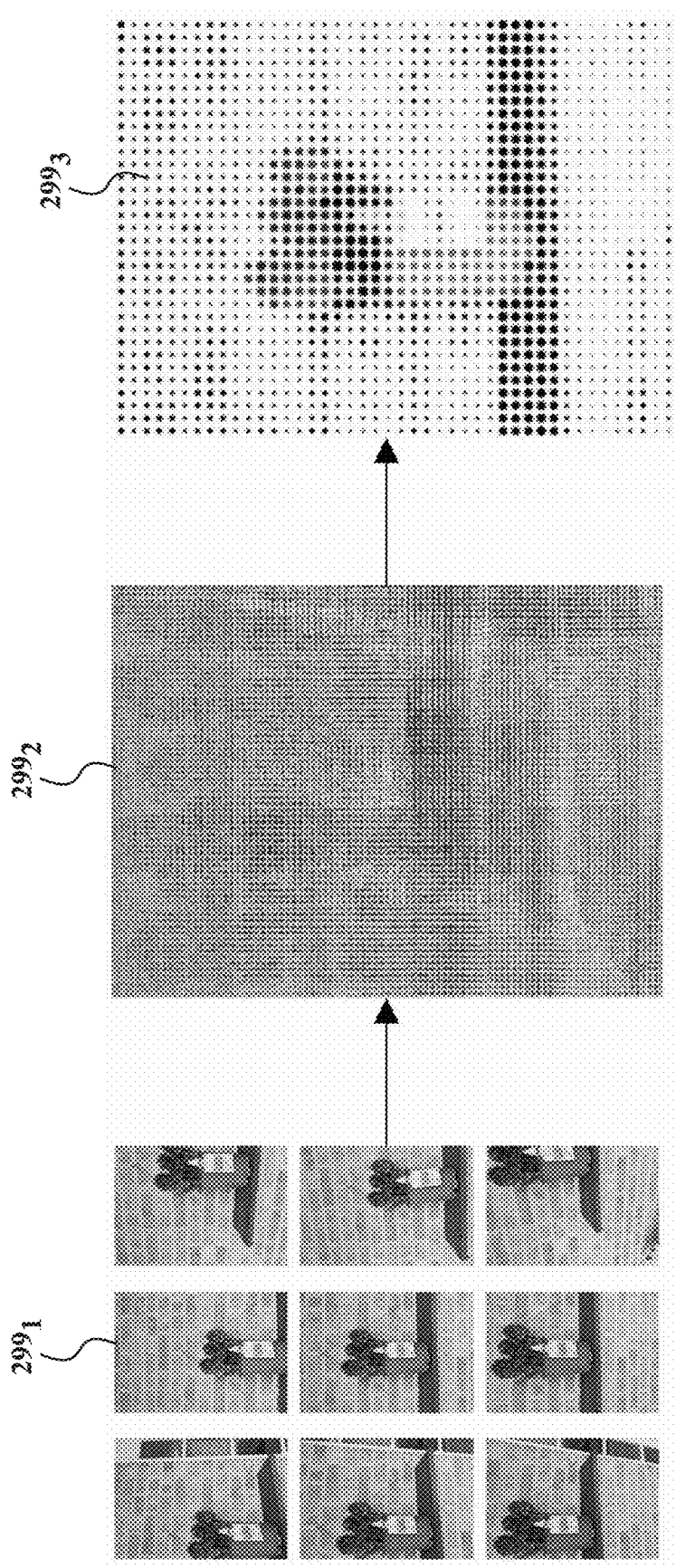

FIG. 2E shows an output of the pixel array 280 or image processor(s) 290 that may be image data $299_2$, including an object for performing tasks to estimate depth. The image data $299_2$ may be a two-dimensional image(s) with multiple views or perspectives captured by the camera system 248 that resolves an angle(s) of the image(s) per pixel. The image data $299_2$ may also be a two-dimensional image(s) with multiple views or perspectives after post-processing that resolves an angle(s) of the image(s) per area, such as quadrant. Furthermore, the image data $299_2$ may include nine images $299_1$ from multiple views having the object with a resolution reduced by nine for a more optimal depth estimate due to an increased range of data. In one approach, the camera system 248 uses per area filtering to output image data similar to the nine images $299_1$ substantially without spaces between segments for estimating depth.

A system for estimating depth may determine the point cloud 2993 from processed nine images $299_1$ or the image data $299_2$, such as by triangulation, with improved accuracy as a result of combining multiple views or perspectives using the camera system 248. A point cloud may be an image created by combining images taken at many angles to measure features, such as depth or range, of an object. The point cloud may be similar to representations generated by LIDAR systems for estimating depth generated with less complexity using the camera system 248 and directional optics.

A camera system may form a 2D matrix representation of image data $299_2$. A camera system may aggregate data from opposite corners of a 2D image matrix to reduce offset thereby improving estimation of depth. For per pixel capture, the 2D matrix may be (row of pixels) x (column of pixels) that represent total intensity and angle information of a plurality of multiple captured images (e.g. nine images) from each pixel formed according to directional optics. The 2D matrix may exclude z-component information to reduce processing. For per area processing, such as by quadrant, a 2D matrix may represent multiple captured images (e.g. nine images) by area similar to $299_1$ substantially without spaces between segments.

Figure 3A:
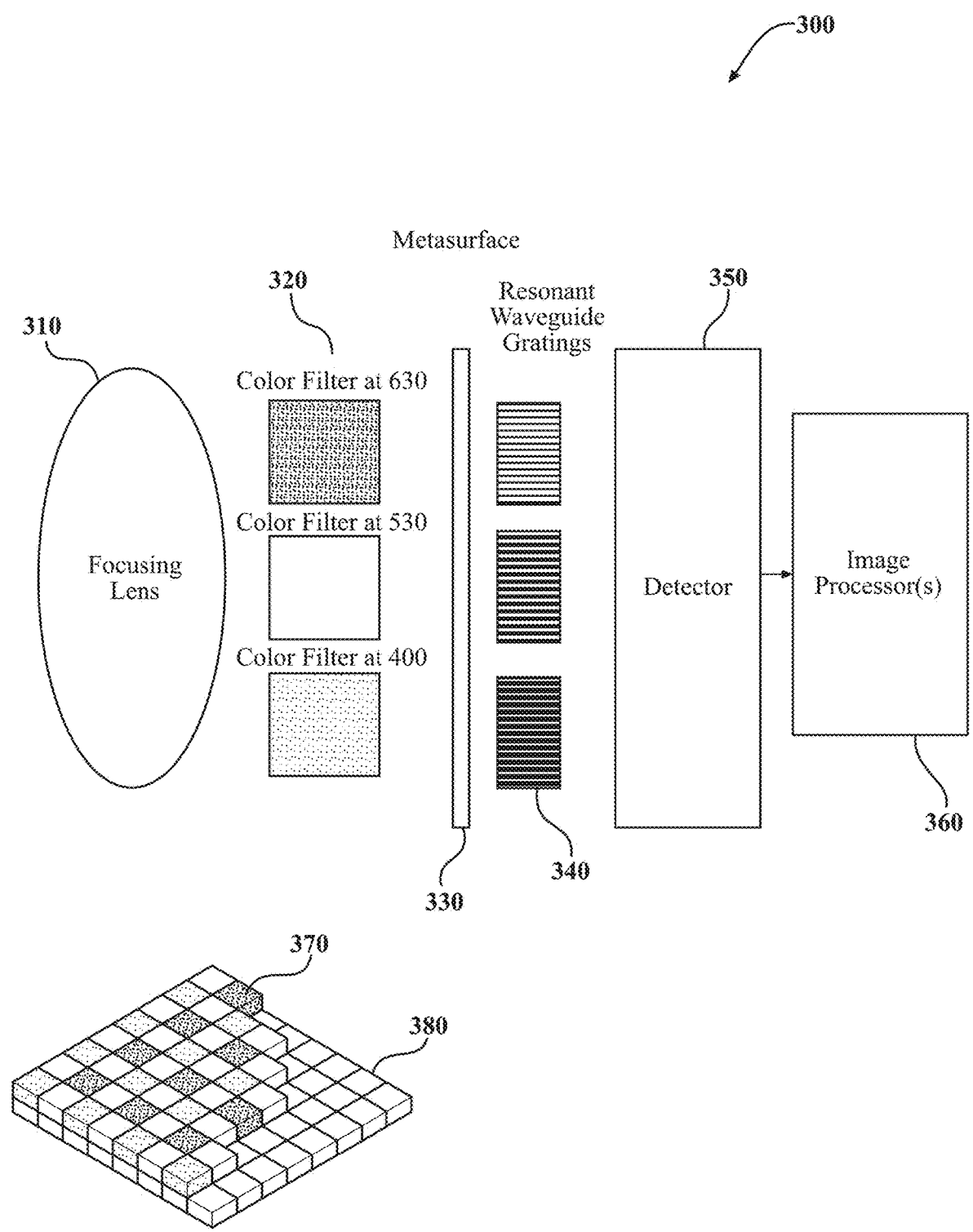
FIGS. 3A and 3B illustrate embodiments of camera systems using color and light filters for estimating depth associated with an object in a scene.
Figure 3B:
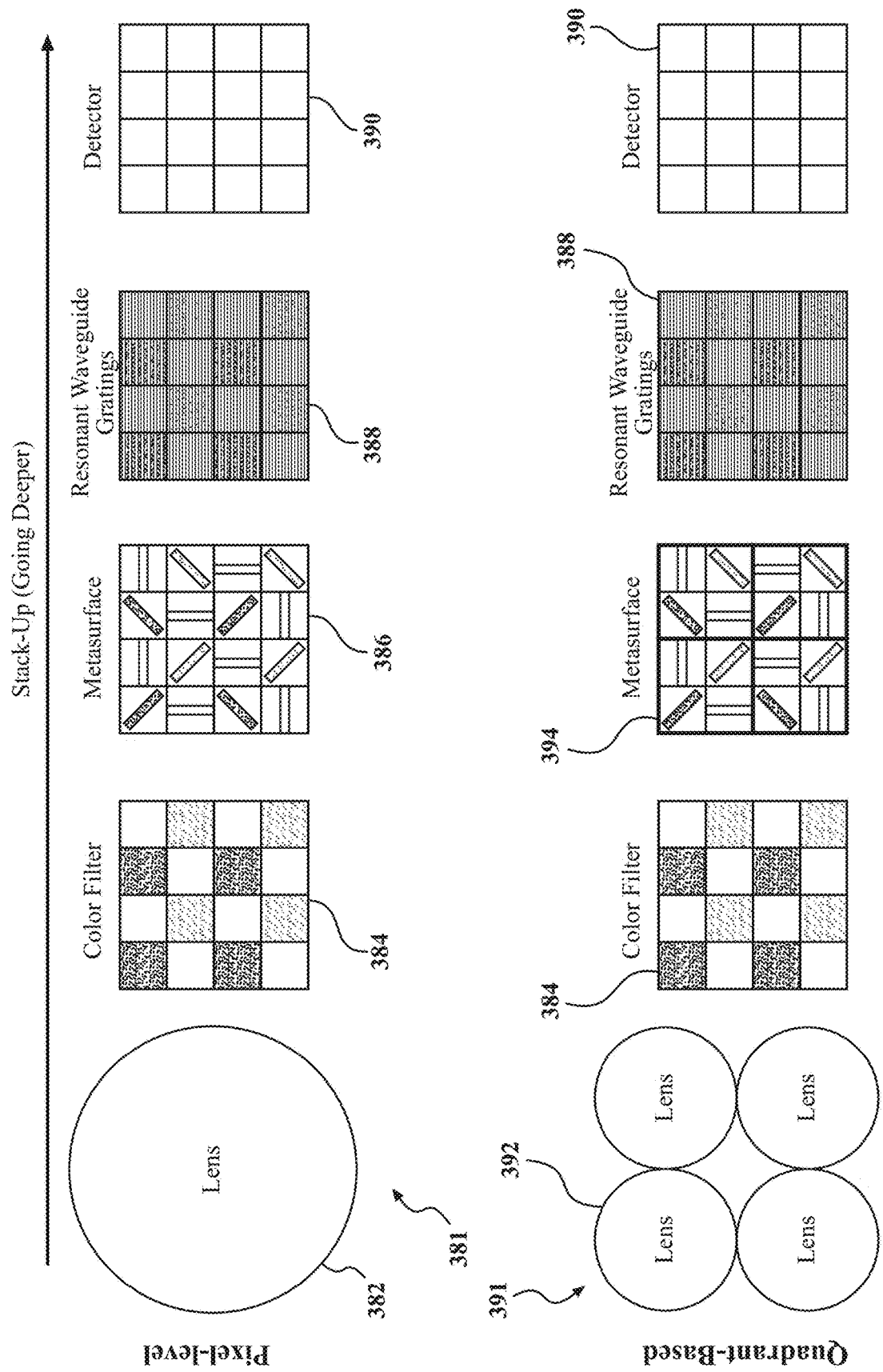

FIGS. 3A and 3B illustrate embodiments of camera systems using color and light filters for estimating depth associated with an object in a scene. A focusing lens 310 may focus and direct a lightwave(s) associated with an object to the color filters 320. A focusing lens may be a single lens or form a lens system. A lens system can include two or more optical elements in conjunction with one or more apertures. An aperture may include irises or pupils. The color filters 320 may comprise a red filter at 630 nanometers (nm), a green filter at 530 nm, and a blue filter at 400 nm wavelengths. The color filters 320 may transmit filtered lightwaves on a color basis to a detector array. The camera system 300 illustrates an arrangement of filters 370 to create color filters on a detector array 380. In one approach, the filters may be Beyer filters that couple with other angle bandpass filters.

In addition, the metasurface 330 may filter a lightwave(s) by removing an angle induced shift, inversion, and/or undo parallel effects associated with the focusing lens 310. The metasurface 330 may correspond to the size of the color filters 320 and provide a substantially flat profile resulting in denser use on a detector and reduced image distortion. For example, the metasurface 330 material may be a photonic band-gap crystal, silicon dioxide, or titanium dioxide. In contrast to other lens systems, the metasurface 330 may be proximate or close to the detector 350 resulting in reduced distortion when filtering an image(s). The detector 350 may be a complementary metal-oxide-semiconductor (CMOS), a charge-coupled device (CCD), and so on pixel array. The image processor(s) 360 may process the output of the detector 350 to estimate depth in a scene.

A camera system 300 may perform angular bandpass filtering using wavelength adaptive RWGs 340. The camera system 300 may use RWGs to selectively transmit a lightwave(s) incident at certain angles to a detector. Furthermore, a fabrication process may produce RWGs by depositing silicon on the surface of a transparent glass slab. RWGs produced by silicon may be desirable for image capture since silicon dioxide has a desirable refractive index of 1.45. In addition, silicon has a varied refractive index along the wavelength spectrum from 400 nm to 700 nm for color image capture.

In one approach, a fabrication process may produce RWGs to resolve the angles of a lightwave(s) using titanium oxide fused to silica. For example, RWGs may stack two or more filters in conjunction with a red filter at 625 nm to allow transmission at an angle of incidence of 10 to 25 degrees. The RWG may also suppress waves at other angles for bandpass filtering prior to detection.

Moreover, RWGs may have minimized transmittance of normally incident light, high transmittance at angles of 15 degrees, or minimized transmittance up to 90 degrees off normal. While the RWGs can restrict a lightwave(s) to transmit at these angles of incidence, the complete spectrum of a lightwave(s) transmitted can be accepted. Accordingly, the camera system 300 may resolve the color and angle combinations desired by combining angular bandpass filtering with color filtering.

In one approach, the RWGs transmit a lightwave(s) to the detector 350 if the lightwave(s) matches a wavelength and the angle of the color filters 320 and the metasurface 330, respectively. In this way, the camera system 300 resolves the color and angle combinations desired by combining angular bandpass filtering with color filtering using the components 320, 330, and 340. Furthermore, the detector may output improved image data in a patterned representation that includes objects for subsequent tasks to estimate depth.

FIG. 3B illustrates stacks of camera systems for per pixel and quadrant filtering to resolve angles of a lightwave(s). For per pixel filtering, the camera system 381 may utilize an inverted or standard lens 382 that receives a lightwave(s) associated with an object. The color filters 384 may filter the lightwaves by wavelength. For instance, the camera system 381 may separate the lightwaves into red, green, or blue components for processing. The metasurface 386 may filter a lightwave(s) by removing an angle induced shift, inversion, and/or undo parallel effects per pixel in association with the inverted or standard lens 382.

Furthermore, wavelength adaptive RWGs 388 may transmit the lightwaves to the detector array 390 if the lightwaves match a wavelength and the angle of the color filters 384 and the metasurface 386, respectively. In one approach, each square in the color filters 384, the metasurface 386, and the RWG 388 may correspond to a pixel of the detector array 390 at a particular wavelength. In this way, the camera system 381 resolves the color and angle combinations desired by combining angular bandpass filtering with color filtering using the components 384, 386, and 388.

For per area filtering, in camera system 391 a divided lens 392 may receive lightwaves at different angles or views in a quadrant associated with an object. Although the camera system 391 uses quadrants, the detector array 390 may be divided into any number of areas to resolve angles associated with the depth detection of an object in a captured image. The color filters 384 may filter the lightwaves by wavelength. For instance, the camera system 391 may separate the lightwaves into red, green, or blue components for processing. The metasurface 394 may filter a lightwave(s) using per area filtering by removing an angle induced shift, inversion, and/or parallel effects associated with the inverted or standard lens 382. The metasurface 394 may be a per quadrant filter of X by X dimensions, where X is the pixel size for a single filter and each quadrant corresponds to a lens size of divided lens 392. The metasurface also may be a number of quadrants divided according to the size of the detector array 390. In one approach, different size apertures may be used for each quadrant allowing capture of various levels of light by quadrant rather than pixel.

Furthermore, the camera system 391 may utilize wavelength adaptive RWGs 388 that transmit the lightwaves to the detector array 390 if the lightwaves match the wavelength and the angle of the color filters 384 and the metasurface 394, respectively. In this way, the camera system resolves the color and angle combinations desired by combining angular bandpass filtering with color filtering using the components 384, 394, and 388.

Figure 4:
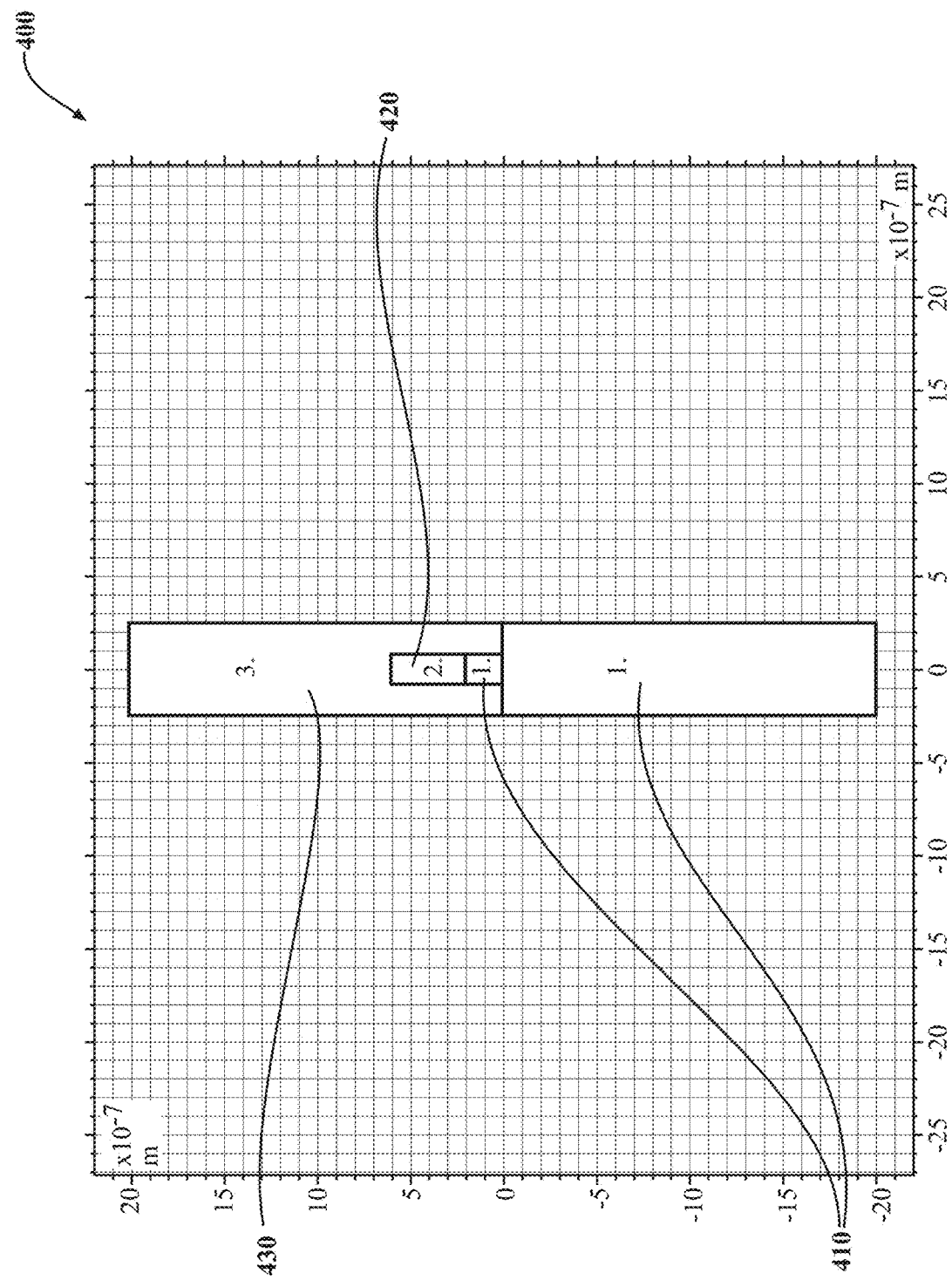
FIG. 4 illustrates a unit lattice representation of a repeating resonant waveguide for filtering of light.

FIG. 4 illustrates a unit lattice representation of a repeating RWG 400 for filtering of light. In one approach, a production process may make the RWG 400 using fused silica 410 and titanium oxide 420 in a symmetric or asymmetric configuration. The RWG 400 may be operated in air 430 or other environments. The unit lattice may repeat in the horizontal direction and the waveguide is continuous into z-axis. Dimensions of the resonant waveguide 400 may be adapted to produce angle-resolved transmission at desired wavelengths to a detector or pixel array to resolve the angles and improve image detection for estimating depth. In one approach, a RWG may diffract light of a first-order to produce angle-resolved transmission. Moreover, within the RWG 400 destructive interference for a lightwave(s) at a specific wavelength may inhibit transmission through the RWG. In contrast, a lightwave(s) that does not interfere or constructively interfere may pass through the RWG.

Figure 5:
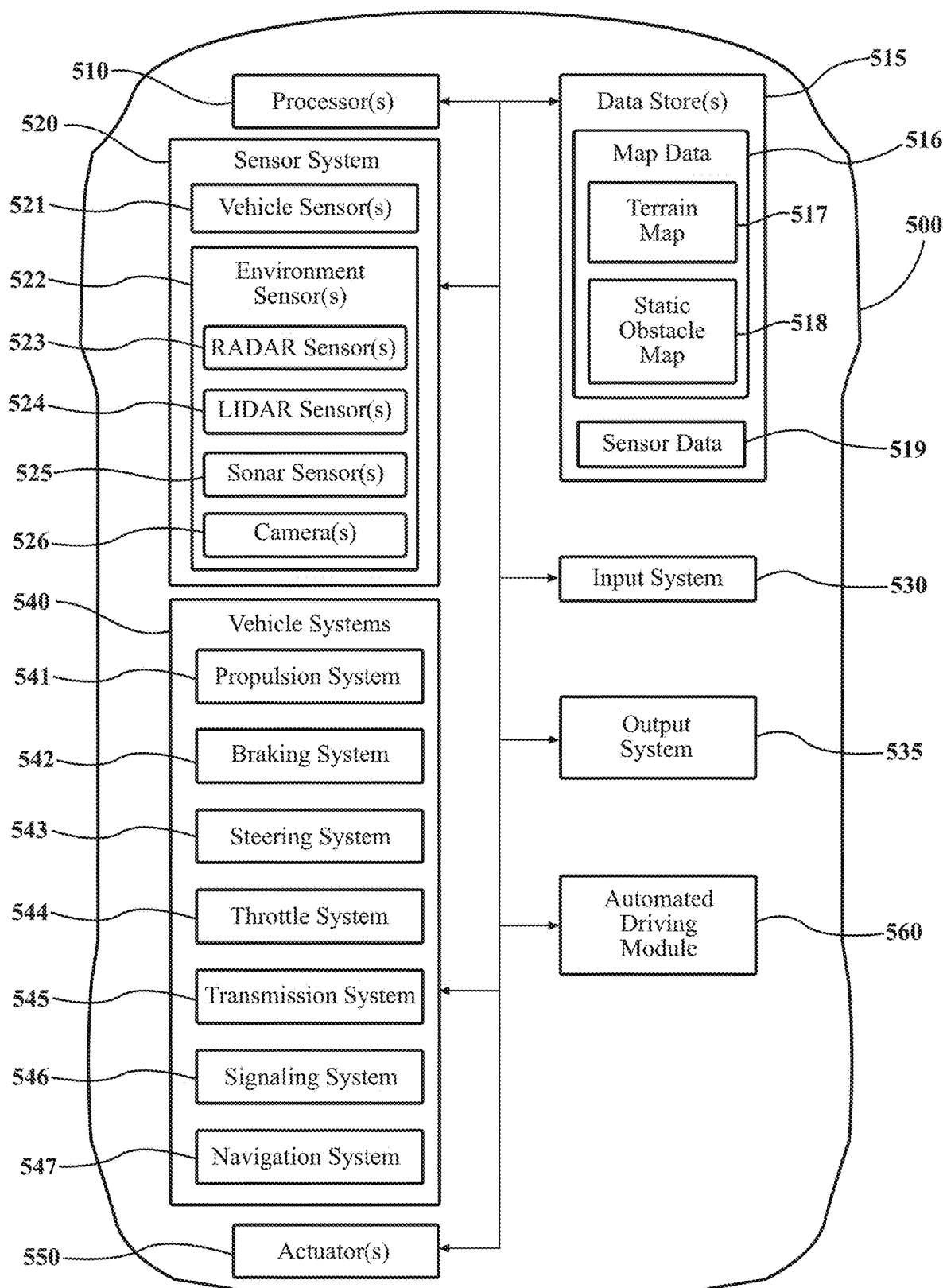
FIG. 5 illustrates a vehicle within which systems and methods disclosed herein may be implemented.

Referring now to FIG. 5, an example of a vehicle 500 is illustrated. As used herein, a "vehicle" is any form of motorized transport. In one or more implementations, the vehicle 500 is an automobile. While arrangements will be described herein with respect to automobiles, it will be understood that embodiments are not limited to automobiles. In some implementations, the vehicle 500 may be any robotic device or form of motorized transport.

The vehicle 500 also includes various elements. It will be understood that in various embodiments it may not be necessary for the vehicle 500 to have all of the elements shown in FIG. 5. The vehicle 500 can have any combination of the various elements shown in FIG. 5. Further, the vehicle 500 can have additional elements to those shown in FIG. 5. In some arrangements, the vehicle 500 may be implemented without one or more of the elements shown in FIG. 5. While the various elements are shown as being located within the vehicle 500 in FIG. 5, it will be understood that one or more of these elements can be located external to the vehicle 500.

For simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In some instances, the vehicle 500 is configured to switch selectively between different modes of operation/control according to the direction of one or more modules/systems of the vehicle 500. In one approach, the modes include: 0, no automation; 1, driver assistance; 2, partial automation; 3, conditional automation; 4, high automation; and 5, full automation. In one or more arrangements, the vehicle 500 can be configured to operate in only a subset of possible modes.

In one or more embodiments, the vehicle 500 is an automated or autonomous vehicle. As used herein, "automated" or "autonomous vehicle" refers to a vehicle that is capable of operating in an autonomous mode (e.g., category 5, full automation). "Autonomous mode" refers to navigating and/or maneuvering the vehicle 500 along a travel route using one or more computing systems to control the vehicle 500 with minimal or no input from a human driver. In one or more embodiments, the vehicle 500 is highly automated or completely automated. In one embodiment, the vehicle 500 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 500 along a travel route.

The vehicle 500 can include one or more processors 510. In one or more arrangements, the processor(s) 510 can be a main processor of the vehicle 500. For instance, the processor(s) 510 can be an electronic control unit (ECU), an application-specific integrated circuit (ASIC), a microprocessor, etc. The vehicle 500 can include one or more data stores 515 for storing one or more types of data. The data store 515 can include volatile and/or non-volatile memory. Examples of suitable data stores 515 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 515 can be a component of the processor(s) 510, or the data store 515 can be operatively connected to the processor(s) 510 for use thereby. The term "operatively connected," as used throughout this description, can include direct or indirect connections, including connections without direct physical contact.

In one or more arrangements, the one or more data stores 515 can include map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry.

In one or more arrangements, the map data 516 can include one or more terrain maps 517. The terrain map(s) 517 can include information about the terrain, roads, surfaces, and/or other features of one or more geographic areas. The terrain map(s) 517 can include elevation data in the one or more geographic areas. The terrain map(s) 517 can define one or more ground surfaces, which can include paved roads, unpaved roads, land, and other things that define a ground surface.

In one or more arrangements, the map data 516 can include one or more static obstacle maps 518. The static obstacle map(s) 518 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 518 can have location data, size data, dimension data, material data, and/or other data associated with it. The static obstacle map(s) 518 can include measurements, dimensions, distances, and/or information for one or more static obstacles. The static obstacle map(s) 518 can be high quality and/or highly detailed. The static obstacle map(s) 518 can be updated to reflect changes within a mapped area.

The one or more data stores 515 can include sensor data 519. In this context, "sensor data" means any information about the sensors that the vehicle 500 is equipped with, including the capabilities and other information about such sensors. As will be explained below, the vehicle 500 can include the sensor system 520. The sensor data 519 can relate to one or more sensors of the sensor system 520. As an example, in one or more arrangements, the sensor data 519 can include information about one or more LIDAR sensors 524 of the sensor system 520.

In some instances, at least a portion of the map data 516 and/or the sensor data 519 can be located in one or more data stores 515 located onboard the vehicle 500. Alternatively, or in addition, at least a portion of the map data 516 and/or the sensor data 519 can be located in one or more data stores 515 that are located remotely from the vehicle 500.

As noted above, the vehicle 500 can include the sensor system 520. The sensor system 520 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 520 includes a plurality of sensors, the sensors may function independently or two or more of the sensors may function in combination. The sensor system 520 and/or the one or more sensors can be operatively connected to the processor(s) 510, the data store(s) 515, and/or another element of the vehicle 500. The sensor system 520 can produce observations about a portion of the environment of the vehicle 500 (e.g., nearby vehicles).

The sensor system 520 can include any suitable type of sensor. Various examples of different types of sensors will be described herein. However, it will be understood that the embodiments are not limited to the particular sensors described. The sensor system 520 can include one or more vehicle sensors 521. The vehicle sensor(s) 521 can detect information about the vehicle 500 itself. In one or more arrangements, the vehicle sensor(s) 521 can be configured to detect position and orientation changes of the vehicle 500, such as, for example, based on inertial acceleration. In one or more arrangements, the vehicle sensor(s) 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The vehicle sensor(s) 521 can be configured to detect one or more characteristics of the vehicle 500 and/or a manner in which the vehicle 500 is operating. In one or more arrangements, the vehicle sensor(s) 521 can include a speedometer to determine a current speed of the vehicle 500.

Alternatively, or in addition, the sensor system 520 can include one or more environment sensors 522 configured to acquire data about an environment surrounding the vehicle 500 in which the vehicle 500 is operating. "Surrounding environment data" includes data about the external environment in which the vehicle is located or one or more portions thereof. For example, the one or more environment sensors 522 can be configured to sense obstacles in at least a portion of the external environment of the vehicle 500 and/or data about such obstacles. Such obstacles may be stationary objects and/or dynamic objects. The one or more environment sensors 522 can be configured to detect other things in the external environment of the vehicle 500, such as, for example, lane markers, signs, traffic lights, traffic signs, lane lines, crosswalks, curbs proximate the vehicle 500, off-road objects, etc.

Various examples of sensors of the sensor system 520 will be described herein. The example sensors may be part of the one or more environment sensors 522 and/or the one or more vehicle sensors 521. However, it will be understood that the embodiments are not limited to the particular sensors described.

As an example, in one or more arrangements, the sensor system 520 can include one or more of each of the following: radar sensors 523, LIDAR sensors 524, sonar sensors 525, weather sensors, haptic sensors, locational sensors, and/or one or more cameras 526. In one or more arrangements, the one or more cameras 526 can be high dynamic range (HDR) cameras, stereo or infrared (IR) cameras.

The vehicle 500 can include an input system 530. An "input system" includes components or arrangement or groups thereof that enable various entities to enter data into a machine. The input system 530 can receive an input from a vehicle occupant. The vehicle 500 can include an output system 535. An "output system" includes one or more components that facilitate presenting data to a vehicle occupant.

The vehicle 500 can include one or more vehicle systems 540. Various examples of the one or more vehicle systems 540 are shown in FIG. 5. However, the vehicle 500 can include more, fewer, or different vehicle systems. It should be appreciated that although particular vehicle systems are separately defined, each or any of the systems or portions thereof may be otherwise combined or segregated via hardware and/or software within the vehicle 500. The vehicle 500 can include a propulsion system 541, a braking system 542, a steering system 543, a throttle system 544, a transmission system 545, a signaling system 546, and/or a navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system or a geolocation system.

The processor(s) 510 or the automated or autonomous driving module(s) 560 can be operatively connected to communicate with the various vehicle systems 540 and/or individual components thereof. For example, the processor(s) 510 and/or the autonomous driving module(s) 560 can be in communication to send and/or receive information from the various vehicle systems 540 to control the movement of the vehicle 500. The processor(s) 510 or the autonomous driving module(s) 560 may control some or all of the vehicle systems 540 and, thus, may be partially or fully autonomous as defined by the society of automotive engineer (SAE) levels 0 to 5.

The processor(s) 510 and the autonomous driving module(s) 560 may be operable to control the navigation and maneuvering of the vehicle 500 by controlling one or more of the vehicle systems 540 and/or components thereof. For instance, when operating in an autonomous mode, the processor(s) 510 or the autonomous driving module(s) 560 can control the direction and/or speed of the vehicle 500. The processor(s) 510 or the autonomous driving module(s) 560 can cause the vehicle 500 to accelerate, decelerate ( ) and/or change direction. As used herein, "cause" or "causing" means to make, force, compel, direct, command, instruct, and/or enable an event or action to occur or at least be in a state where such event or action may occur, either in a direct or indirect manner.

The vehicle 500 can include one or more actuators 550. The actuators 550 can be an element or combination of elements operable to alter one or more of the vehicle systems 540 or components thereof responsive to receiving signals or other inputs from the processor(s) 510 or the autonomous driving module(s) 560. For instance, the one or more actuators 550 can include motors, pneumatic actuators, hydraulic pistons, relays, solenoids, and/or piezoelectric actuators, just to name a few possibilities.

The vehicle 500 can include one or more modules, at least some of which are described herein. The modules can be implemented as computer-readable program code that, when executed by a processor 510, implement one or more of the various processes described herein. One or more of the modules can be a component of the processor(s) 510, or one or more of the modules can be executed on and/or distributed among other processing systems to which the processor(s) 510 is operatively connected. The modules can include instructions (e.g., program logic) executable by one or more processor(s) 510. Alternatively, or in addition, one or more data store 515 may contain such instructions.

The vehicle 500 can include one or more autonomous driving modules 560. The autonomous driving module(s) 560 can be configured to receive data from the sensor system 520 and/or any other type of system capable of capturing information relating to the vehicle 500 and/or the external environment of the vehicle 500. In one or more arrangements, the autonomous driving module(s) 560 can use such data to generate one or more driving scene models. The autonomous driving module(s) 560 can determine position and velocity of the vehicle 500. The autonomous driving module(s) 560 can determine the location of obstacles, obstacles, or other environmental features including traffic signs, trees, shrubs, neighboring vehicles, pedestrians, etc.

The autonomous driving module(s) 560 can be configured to receive, and/or determine location information for obstacles within the external environment of the vehicle 500 for use by the processor(s) 510, and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The autonomous driving module(s) 560 can be configured to determine travel path(s), current autonomous driving maneuvers for the vehicle 500, future autonomous driving maneuvers and/or modifications to current autonomous driving maneuvers based on data acquired by the sensor system 520, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The autonomous driving module(s) 560 can be configured to implement determined driving maneuvers. The autonomous driving module(s) 560 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 560 can be configured to execute various vehicle functions and/or to transmit data to, receive data from, interact with, and/or control the vehicle 500 or one or more systems thereof (e.g., one or more of vehicle systems 540).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Aspects herein can be embodied in other forms without departing from the spirit or essential attributes thereof. Accordingly, reference should be made to the following claims, rather than to the foregoing specification, as indicating the scope hereof.

What is claimed is:

1. A camera system comprising:
 a lens, operatively connected to a color filter, to receive light associated with an object;
 a metasurface, directly connected to the color filter, that inverts the light;
 a resonant waveguide grating (RWG), directly connected to the metasurface, having physical characteristics that resolve an angle of the light for offsets from a planar feature of the light; and
 a detector array, directly connected to the RWG, that senses the light using a pixel and combines the light with resolved lightwaves from adjacent pixels to form a patterned representation of aggregated image data having scene features and incorporating overlapping views of the object within an expanded field-of-view, wherein the pixel is associated with an area of the RWG and the pixel and the adjacent pixels capture a directed view of the object to estimate depth.

2. The camera system of claim 1, wherein the patterned representation has depth information and a resolution that varies among the overlapping views and the expanded field-of-view.

3. The camera system of claim 1, wherein the color filter is associated with a wavelength of the light for a driving scene.

4. The camera system of claim 3, wherein the RWG is a bandpass filter that transmits the light to the pixel at the wavelength and the angle.

5. The camera system of claim 1, wherein the patterned representation includes feature information of the object that overlaps and that is utilized to estimate the depth.

6. The camera system of claim 1, wherein the RWG is a metasurface composed of a photonic band-gap crystal.

7. The camera system of claim 1, wherein a point cloud is formed by triangulating information from the patterned representation for the depth.

8. A camera system comprising:
 a lens, operatively connected to a color filter, to receive light associated with an object;
 a metasurface, directly connected to the color filter, that inverts the light;
 a resonant waveguide grating (RWG), directly connected to the metasurface, having physical characteristics that resolve an angle of the light for offsets from a planar feature of the light; and
 a detector array, directly connected to the RWG, that senses the light in a section of the detector array and combines the light with resolved lightwaves to form a patterned representation of aggregated image data having scene features and incorporating overlapping views of the object within an expanded field-of-view, wherein the section and the RWG capture a directed view of the object to estimate depth.

9. The camera system of claim 8, wherein the patterned representation has depth information and a resolution that varies among the overlapping views and the expanded field-of-view.

10. The camera system of claim 8,
wherein the color filter is associated with a wavelength of the light for a driving scene.

11. The camera system of claim 10, wherein the RWG is a bandpass filter configured to transmit the light to the section of the detector array at the wavelength and the angle.

12. The camera system of claim 8, wherein the patterned representation includes feature information of the object that overlaps and that is utilized to estimate the depth.

13. The camera system of claim 8, wherein the section directly corresponds to an area of the metasurface, the RWG, and a group of pixels of the detector array associated with the angle.

14. The camera system of claim 8, wherein a point cloud is formed by triangulating information from the patterned representation for the depth.

15. A camera system comprising:
a lens, operatively connected to a color filter, to receive light associated with an object proximate to a vehicle;
a metasurface directly connected to the color filter and configured to invert the light;
a resonant waveguide grating (RWG) directly connected to the metasurface having physical characteristics that resolve an angle of the light for offsets from a planar feature of the light; and
a pixel array directly connected to the RWG and configured to sense the light using a pixel and combines the light with resolved lightwaves from adjacent pixels to form a patterned representation of aggregated image data having scene features and incorporating overlapping views of the object within an expanded field-of-view, wherein the pixel is associated with an area of the RWG and the pixel and the adjacent pixels capture a directed view of the object to estimate depth.

16. The camera system of claim 15, wherein the patterned representation has depth information and a resolution that varies among the overlapping views and the expanded field-of-view.

17. The camera system of claim 15,
wherein the color filter is associated with a wavelength of the light for a driving scene.

18. The camera system of claim 17, wherein the RWG is a bandpass filter configured to transmit the light to the pixel at the wavelength and the angle.

19. The camera system of claim 15, wherein the patterned representation includes feature information of the object that overlaps and that is utilized to estimate the depth.

20. The camera system of claim 15, wherein the RWG is a metasurface composed of a photonic band-gap crystal.

* * * * *